June 13, 1933.     R. E. KRUG     1,913,399
ENGINE
Filed Aug. 12, 1929    4 Sheets-Sheet 1
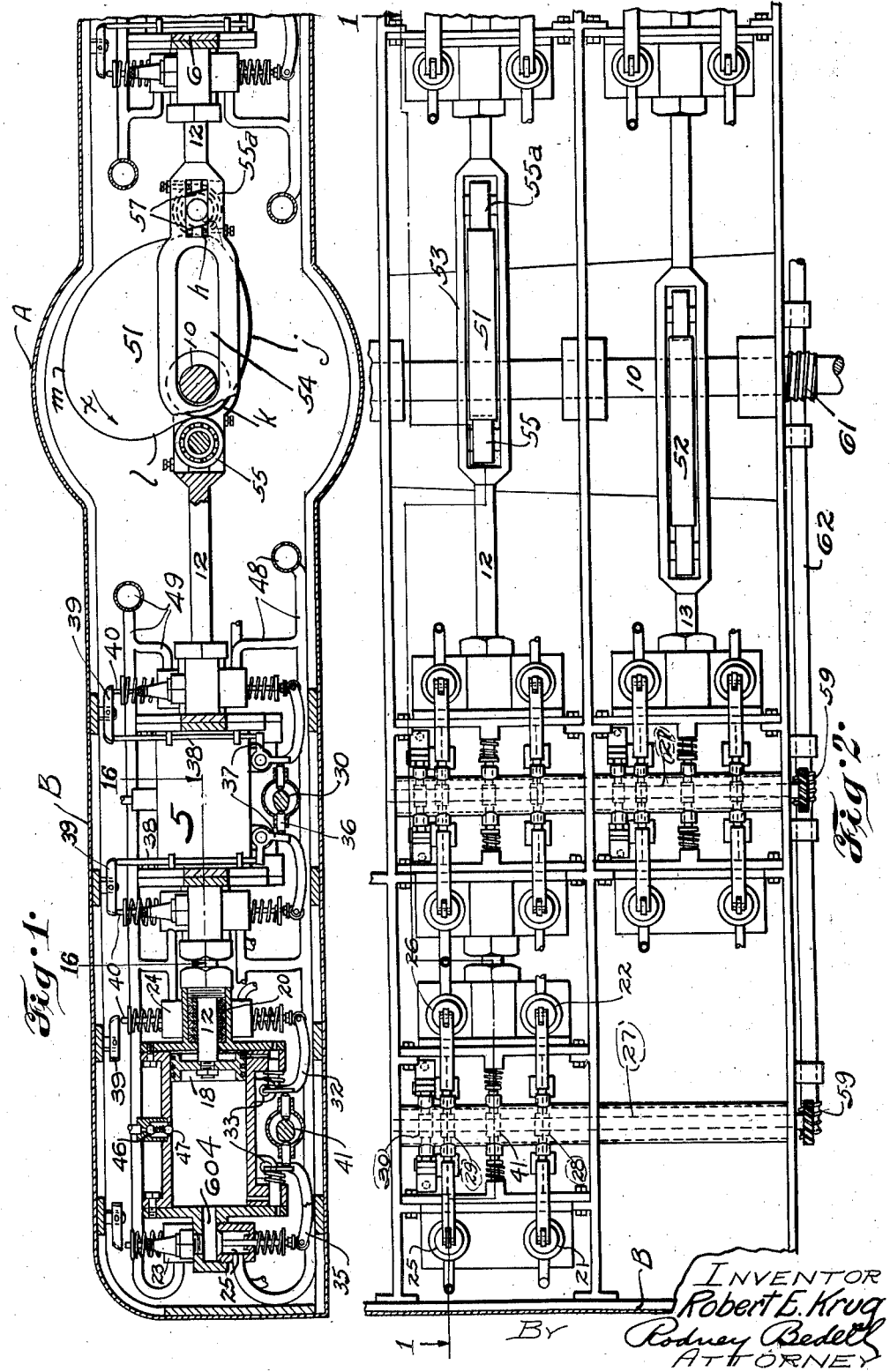

June 13, 1933.  R. E. KRUG  1,913,399
ENGINE
Filed Aug. 12, 1929  4 Sheets-Sheet 2
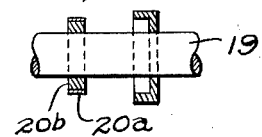
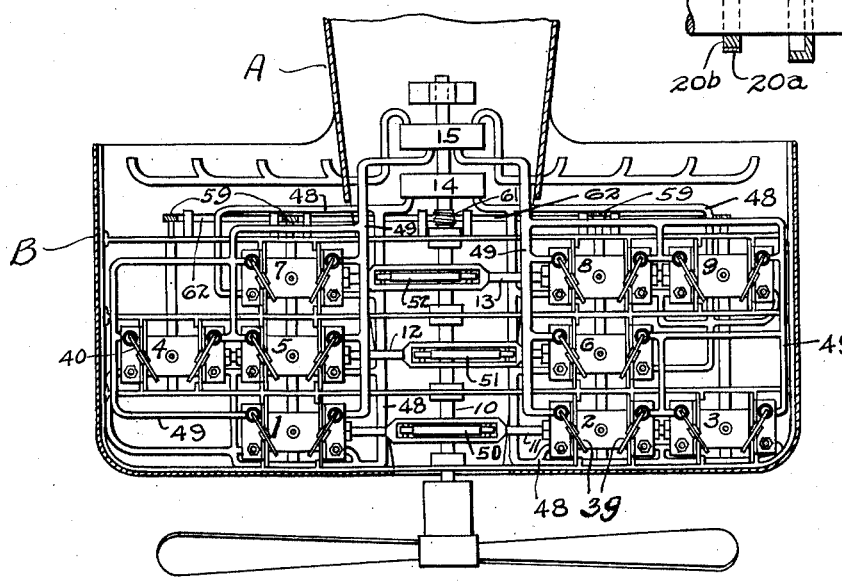
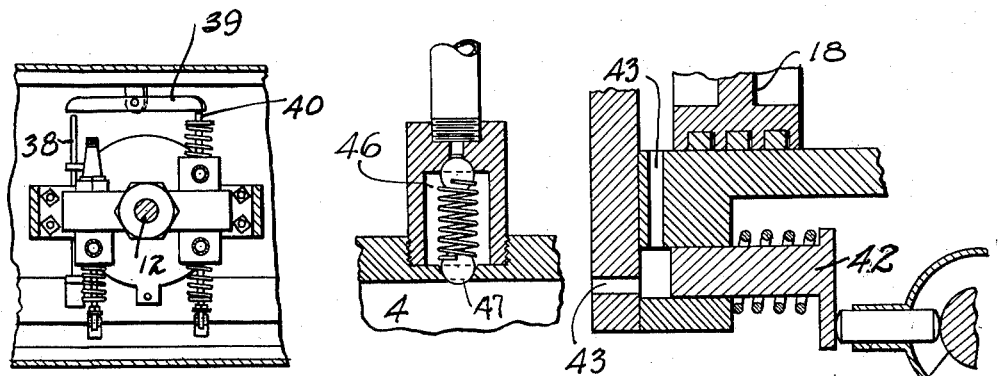
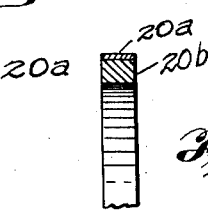
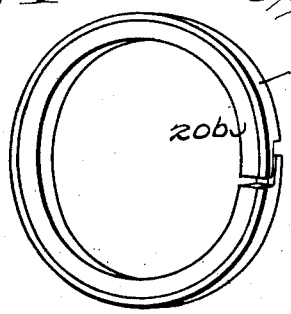
INVENTOR
Robert E. Krug
By Rodney Bedell
ATTORNEY

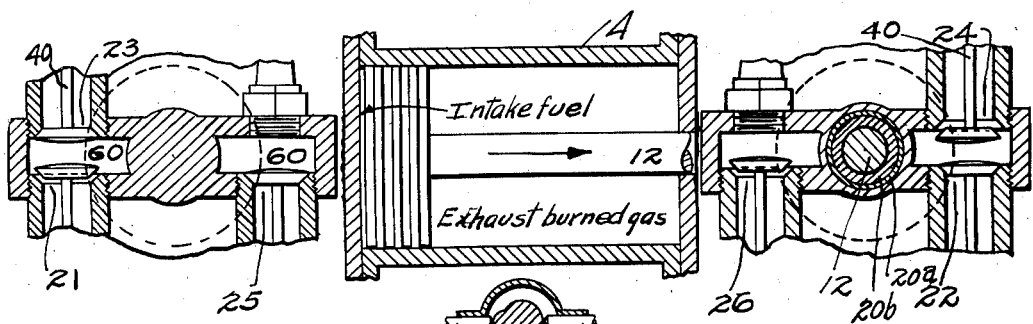
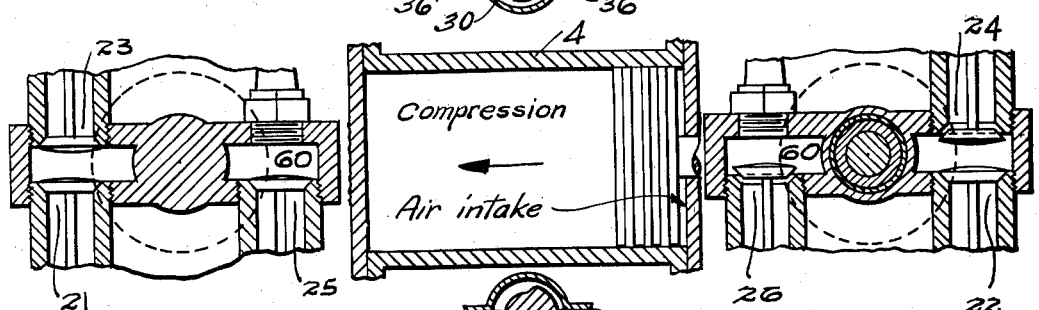
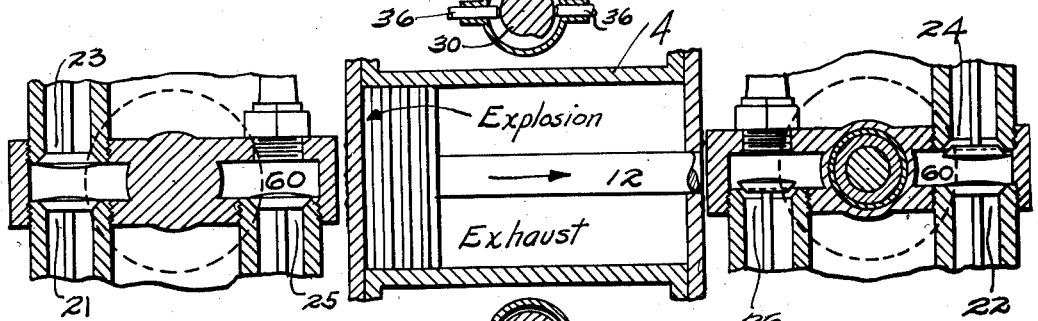

June 13, 1933.  R. E. KRUG  1,913,399
ENGINE
Filed Aug. 12, 1929    4 Sheets-Sheet 4
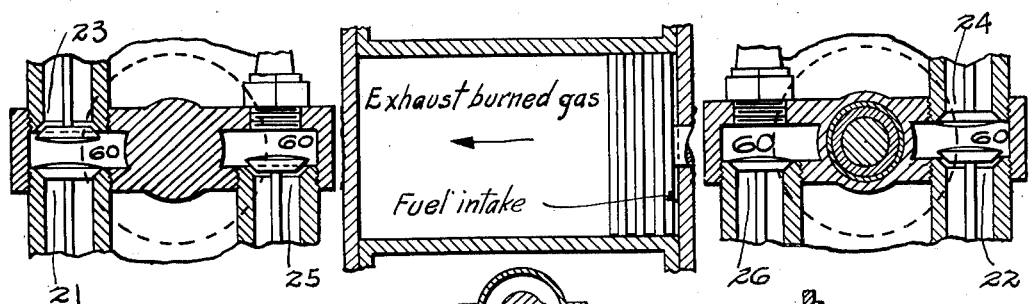
Fig. 10.
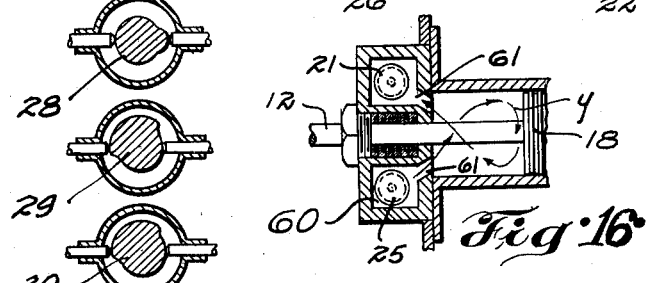
Fig. 16.
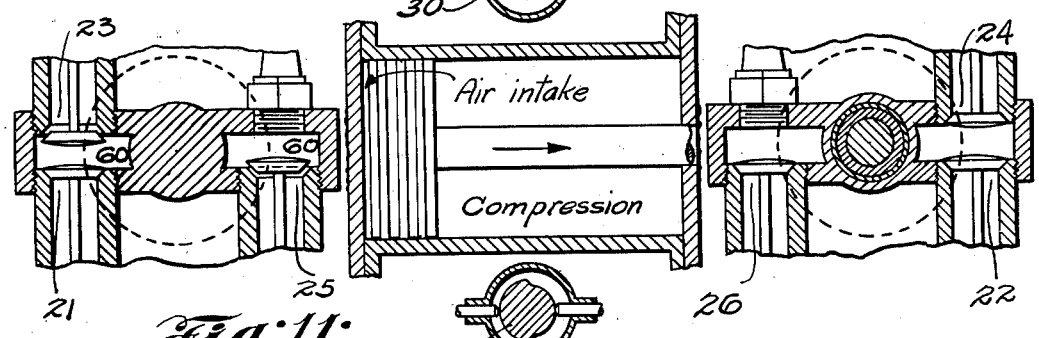
Fig. 11.
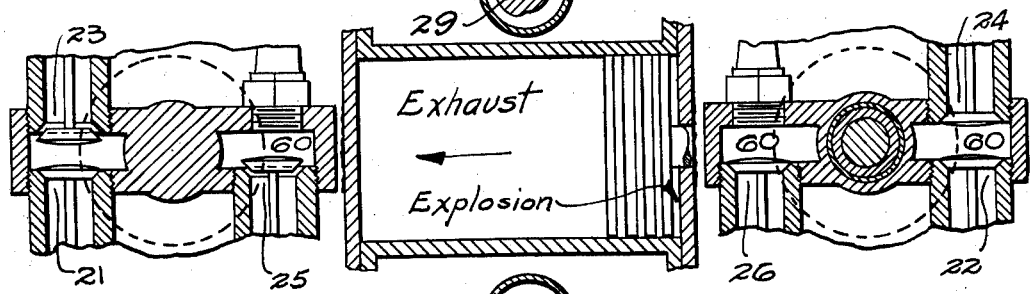
Fig. 12.
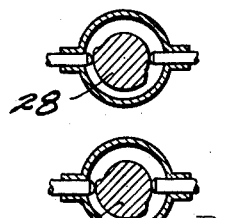
INVENTOR
Robert E. Krug
By Rodney Bedell
ATTORNEY Patented June 13, 1933

1,913,399

UNITED STATES PATENT OFFICE

ROBERT E. KRUG, OF GRANITE CITY, ILLINOIS, ASSIGNOR, BY MESNE ASSIGNMENTS, TO KRUG AIRCRAFT ENGINEERING COMPANY, OF ST. LOUIS, MISSOURI, A CORPORATION OF DELAWARE

ENGINE

Application filed August 12, 1929. Serial No. 385,114.

My invention relates to prime movers and includes a number of novel features particularly applicable to internal combustion motors and other features which may be used with any type of reciprocating motor.

The main object of my invention is to produce an engine unit including a plurality of double acting cylinders arranged end to end and having a common driving rod through which the cylinders drive a power shaft.

An additional object of my invention is to utilize a group of three double acting cylinders each operating on a six stroke cycle wherein each stroke will include a power impulse on one side of one of the pistons.

A further object of my invention is to include in such an engine suitable scavenger air supply and exhaust means.

I also desire to arrange the cylinders of the engine unit on opposite sides of the power shaft and to operate the power shaft by a driving rod having reciprocal movement only.

A further object of my invention is to provide a power shaft in which the usual crank-like offsets are eliminated.

Another object of my invention is to provide a horizontal engine of comparatively slight height that is particularly adapted for use in aeroplanes; and in my copending application, Serial No. 371,585, filed June 17, 1929, I illustrate a novel aeroplane structure made possible by the use of the engine forming the subject-matter of the present application.

These and other detailed objects of my invention are attained by the structure illustrated in the accompanying drawings, in which Figure 1 is a vertical section illustrating a portion of an engine unit, and is taken substantially on line 1—1 of Figure 2.

Figure 2 is a bottom view of the engine structure shown in Figure 1.

Figure 3 is a similar view on a smaller scale showing a preferred arrangement of complete power plant as applied to an aeroplane.

Figure 4 is a detail end view of a cylinder and valve lever structure showing other parts in section.

Figure 5 is a detail of a lubricating valve.

Figure 6 is a detail of an oil discharge valve.

Figure 7 is a composite section of one cylinder, explosion chambers and valve cams showing relative positions of the piston and of air, fuel and exhaust valves at both ends of the cylinder.

Figures 8, 9, 10, 11 and 12 are corresponding views showing the successive positions of the same piston, valves and cams during the successive strokes of the engine. The arrows in Figures 7 to 12 indicate the direction of stroke just beginning.

Figures 13, 14 and 15 illustrate the packing rod ring.

Figure 16 is a detail section taken approximately on line 16—16 of Figure 1.

The general arrangement of my engine is shown in Figure 3, in which the forward portion of an aeroplane fuselage is indicated at A, lateral fins B extending laterally therefrom and mounting a horizontally disposed power plant comprising nine cylinders 1, 2, 3, 4, 5, 6, 7, 8 and 9. These cylinders are arranged in groups of three cylinders each, each group comprising one cylinder on one side of the propeller or power shaft 10 and two cylinders on the other side of the power shaft. Each group of three cylinders is provided with a common piston rod 11, 12 and 13, respectively.

The power plant includes a pump 14 for supplying compressed air to the cylinders, and another pump 15 for exhausting air and the products of combustion from the cylinders.

Cylinders 4, 5 and 6 (Figure 3 and Figure 1) comprise one group or unit of the engine, and each cylinder includes a piston 18 connected to a common piston rod or driving rod 12 which extends entirely through the cylinder 5 and has its ends secured to the piston 18 in cylinders 4 and 6.

Where the rod passes through the end walls of the cylinders, I provide a stuffing box and a series of split rings 20 each having a step joint at its ends. One of the rings is detailed in Figures 13, 14 and 15 and includes an outer portion 20$^a$ of spring brass and an inner portion 20$^b$ of nickel steel. The brass portion, having the higher coefficient of expansion, will expand more than the nickel portion, when heated, thereby causing the inner nickel portion to curve around and hug the rod more closely than would be the case if the entire ring was of steel. Obviously the nickel will not wear as rapidly as a solid brass ring.

Each cylinder is of the double acting type in which explosions take place on opposite sides of the piston on different strokes of the engine. Accordingly, the opposite ends of the cylinder are provided with explosion chambers 60 having suitable valve cages for fuel valves 21, 22, respectively, exhaust valves 23 and 24, respectively, and compressed air valves 25 and 26, respectively.

The engine works on a six stroke cycle and the cycle for each cylinder is as follows:

| | Left hand end of cylinder | Right hand end of cylinder |
|---|---|---|
| First stroke | Fuel intake | Exhaust burned gas |
| Second stroke | Compression | Receive air |
| Third stroke | Explosion | Exhaust air |
| Fourth stroke | Exhaust burned gas | Fuel intake |
| Fifth stroke | Receive air | Compression |
| Sixth stroke | Exhaust air | Explosion |

Assuming that the piston shown in cylinder 4 in Figure 1 has just completed a fuel intake stroke and is at the beginning of a compression stroke, a detail of the cylinder, piston and its valves will be found in Figure 8 in which each of the valves for the left hand end of the cylinder is closed.

The fuel, exhaust and air valves for both ends of the cylinder are operated by a single cam shaft 27 provided with three main cams 28, 29 and 30 (Figure 2). Cam 28 operates the two intake valves by thrusting the valve rods 31 against the valve levers 32 which are pivoted at 33. Cam 29 similarly operates the rods 34 which move the air valve levers 35. Cam 30 operates pins 36 which engage bell crank levers 37 pivoted on the cylinder and through the bell cranks operate the valve rods 38 which extend to the top of the cylinder and engage levers 39 which in turn engage exhaust valve stems 40. Gear 61 on shaft 10 drives a cross shaft 62 with gearing 59 operating all the cam shafts 27.

Since the valve and valve cam arrangement is the same for each cylinder (although timed differently), I have applied the same valve and cam reference numerals to the different cylinder structures in order to simplify description.

Scavenging and cooling air is supplied to each of the cylinders from the air pump 14 through the conduits 48 and the exhaustion of this air and of the burned gases is facilitated by the use of an exhaust pump 15 connected with each of the exhaust valves by the conduits 49.

The power shaft 10 is straight from end to end and mounts three cams 50, 51 and 52. These cams are set at an angle of 120° to each other about shaft 10 and each cam is on the axis of a corresponding piston rod and group of cylinders. Referring to cam 51 and associated parts, driving rod 12 includes an intermediate yoke 53 extending on both sides of the cam and each side of the yoke has a slot 54 which receives the power shaft. Anti-friction bearing units 55 and 55ª are journalled in the ends of yoke 53 with their outer races engaging cam 51. Wedges 57 form means for taking up play between the cam and the bearings.

Cam 51, rotating as indicated by the arrow X, has a "leading" edge $j$—$k$ and a "lagging" edge $l$—$m$. The "leading" edge starts at $h$ a point at the maximum distance from the power shaft which forms the axis of the cam. From point $h$, the "leading" edge of the cam, throughout the first 128° ($j$) of the cam movement, rapidly approaches the cam axis. Then follows the arc $k$ of 52° which is substantially described about the axis as a center and forms a "dwell" on the cam throughout which portion of the cam the pistons will remain stationary. This "dwell" is followed by an abrupt rise $l$ which corresponds to the rapid drop of the first part of the leading edge of the cam and merges into a section $m$ which will bring the cam surface back to the starting point $h$.

The piston travel provided by this type of cam is highly effective, as will be seen by following a cycle of the engine. For example, starting from the position shown in Figure 1, the piston 18 will move to the left rapidly at the begining of its stroke, gradually slowing up through the latter part of the 128° arc, whereby the piston movement will be rapid while the degree of compression of the gas is relatively small, and the piston movement will be slower as the degree of compression increases. Ignition will occur approximately at the beginning of the 52° arc, but as the piston does not have any further movement towards the end of the cylinder, initial burning of the fuel takes place without any "spark" or "preignition" knock.

The force of the explosion is first applied (through the piston, piston rod and bearing 55) to the cam 51 at the point of the cam located at the greatest distance from the power shaft. The power generated by an explosion is very short lived and the quicker it can be delivered to a rotating shaft the greater will be its value. With my construction, this maximum power is applied to the power shaft through the maximum leverage provided by the mechanism. This construction is a marked advantage over that provided in the ordinary internal combustion engine in which the crank shaft must travel approximately a sixth of a revolution before the piston leverage approaches the maximum, during which time the explosive force is relatively ineffective. At the begining of the firing stroke in my engine, the piston will travel very fast thereby allowing the gas to expand quickly. The piston will gradually lose speed until at 128° rotation of the cam, the piston will have completed its full stroke. Since the space for the exploded gas is rapidly increased, the gas will expand to a greater degree and with less heat than in an ordinary engine in which the expansion is restrained for a greater period of time.

The exhaust valve will be opened about the beginning of the 52° "dwell" and the timing of the exhaust valve opening corresponds to the practice generally followed in internal combustion engines. In my engine, however, the piston has reached the extreme limit of its travel as the exhaust valve opens, whereas in the ordinary engine the piston continues to travel away from the cylinder head after the exhaust valve is opened. Hence, with a given fuel charge and a corresponding piston displacement, there will be less pressure in the cylinder at the time the exhaust valve is opened and, therefore, less report through the exhaust valve, which makes for a quieter engine.

Furthermore, the "dwell" permits the shaft to absorb the momentum of the piston which is ordinarily lost because of the immediate reversal of direction of the piston movement at the end of a stroke. With this "dwell" there is ample time for any compression in the cylinder to be relieved before the piston starts on the return stroke, hence, there will be no undue pressure on the piston on its return stroke. In other words, the force of the explosion is applied to my piston throughout its stroke, whereas in the ordinary crank shaft engine the explosive force practically ceases to move the piston when the exhaust valve opens although the piston has just attained its greatest leverage against the crank and still has to complete over twenty percent of its stroke.

When the piston starts upon the exhaust stroke it will again start out fast and slow up towards the end and stand still for approximately 52° at the end of the stroke, which will afford ample time to relieve any pressure that may have been built up on the exhaust stroke.

The exhaust valve remains open through the next two strokes and throughout the period while the exhaust valve is open, the exhaust pump 15 will be functioning to accelerate the exhaust over the speed which would result from the ordinary difference in pressures in the cylinder and the atmosphere and the force of the piston.

After the exhaust valve is opened and throughout the period while the exhaust valve is open and the exhaust pump is functioning as described, the compressed air pump 14 is supplying air to the same end of the cylinder, the air intake valve and the exhaust valve are at opposite sides and are at top and bottom, respectively, of the expansion chamber 60 and the passageways 61 from the chamber 60 to the cylinder are inclined, as indicated in Figure 16, whereby the compressed air travels diagonally inwardly of the cylinder, strike side of the cylinder opposite to the location of the valve, is reflected against the piston and the opposite side of the cylinder and is again reflected so as to travel diagonally outwardly of the cylinder, all as indicated by the line $y$ in Figure 2. This provides for a thorough scavenging of the products of combustion and an adequate cooling of the cylinder. A reference to the successive valve positions, as shown in Figures 7 to 11, will show that an air stream is always passing through one end of each cylinder or the other.

The wall of each cylinder is provided with an automatic lubricating valve 46 including an inner check ball 47 which is retracted by the piston 18 whenever the latter passes the valve and permits the deposit of a small amount of lubricant on the piston surface. Valves 46 are supplied by means of a suitable pump (not shown).

Intermediate cams 28 and 29 is a cam 41 which operates a plunger 42 to close an opening 43 leading from the cylinder. The piston tends to wipe a quantity of oil to the ends of the cylinder, and the function of this opening 43 is to permit the drainage of lubricating oil from the lowermost point of the cylinder. Cam 41 moves the plunger to closed position during compression and expansion strokes.

Since each engine unit comprises three double acting cylinders each having a six stroke cycle, there will be a power impulse on one piston in one end of one cylinder at each stroke. This impulse will be delivered to the power shaft and in a direct line to the other two pistons of the unit which are engaged in other strokes of their cycle, thus eliminating the tortional stresses set up in the ordinary crank shaft in which the power thrust of one piston is applied to another piston through a line off-set for a substantial portion of the length of the shaft.

The engine assembly is particularly advantageous for aeroplane power plants in that the horizontally disposed cylinders may be enclosed in a comparatively shallow fin or fuselage construction whereby a relatively small area of head resistance is presented.

It will be understood that the general arrangement of the engine is not limited to internal combustion engines but may be embodied in other engines. Obviously, in a mechanism of the type described, many details may be varied without departing from the principle of operation and I contemplate the exclusive use of such modifications of my invention as come within the scope of my claims.

I claim:

1. In an engine, a power shaft, three firing cylinders in axial alinement with each other with their common axis extending transversely of said shaft, two of said cylinders being located on one side of the power shaft and one of said cylinders being located on the other side of the power shaft, pistons in said cylinders, and means operatively connecting said pistons and said power shaft.

2. In an engine, two groups of firing cylinders and pistons, each group comprising a series of three cylinders arranged end to end, and a power shaft operatively connected to said pistons, two cylinders of one group being on one side of said shaft and one cylinder of the same group being on the other side of said shaft, and the cylinders of the other group being arranged conversely with respect to said shaft.

3. In an engine, a power shaft, and three groups of firing cylinders and pistons operatively connected to said shaft, each of said groups comprising cylinders and pistons arranged on opposite sides of said shaft and applying driving forces to the same from opposite directions, the application of driving forces from each group occurring 120 degrees apart in the revolution of the power shaft.

4. In an engine, a plurality of firing cylinders with their axes lying in the same plane, a power shaft lying in the same plane and extending transversely of the axes of said cylinders, said cylinders being arranged in groups of three cylinders each, each group, including cylinders on opposite sides of said shaft and the number of cylinders on one side of said shaft in one group differing from the number of cylinders on the same side of said shaft in the next group.

5. In an engine, a series of three firing cylinders arranged in axial alinement, pistons therein, a power shaft extending transversely of the axis of said cylinders and pistons and located between two of them, and a single driving rod for all of said pistons and power shafts disposed axially of said cylinders.

6. In an engine, a series of three firing cylinders arranged end to end, pistons therein, a power shaft extending transversely of said cylinders and between two of them, and a common straight piston rod having reciprocal movement only in said cylinders and operatively connected to said power shaft.

7. In an engine, a series of three firing cylinders arranged in axial alinement, a single piston rod disposed axially of said cylinders and extending entirely through one of said cylinders and into both of the others of said cylinders, pistons fixed on said rod in each of said cylinders, and a power shaft operatively connected to said piston rod.

8. In a six cycle engine, three firing cylinders, individual pistons therefor, a common piston rod for said pistons, an air pump, two fuel inlet valves in each cylinder, one on each side of the respective piston, two compressed air valves in each cylinder, one on each side of the respective piston, two exhaust valves in each cylinder, one on each side of the respective piston, two firing elements in each piston, one on each side of the respective piston, and timing mechanism providing a cycle of fuel inlet, compression, firing, exhaust, air inlet and air exhaust strokes in each cylinder said mechanism providing a power stroke on one side of one piston during each cycle.

9. An engine structure as described in claim 8 in which the timing mechanism provides firing in the three cylinders consecutively upon successive cycles.

10. In an engine, a series of three firing cylinders arranged end to end, pistons therein, each cylinder and piston being double acting, each end of each cylinder and the corresponding piston end having a cycle of six strokes, and the cylinders and pistons being arranged so that no two cylinder ends and corresponding piston ends are in the same cyclic position at the same time.

11. In a three firing cylinder double acting engine unit, an air pump, a compressed air conduit, a fuel inlet conduit, and an exhaust conduit, and valves near each end of each of said cylinders controlling respectively the connections to each of said conduits.

12. In an engine of the class described, an air pump, an exhaust pump, a double acting firing cylinder, a piston, firing mechanism, and valves and valve operating mechanism at each end of said cylinder for admitting fuel and admitting air from said air pump on different strokes of said piston and for opening said cylinder to said exhaust pump after the operation of each of said firing devices and throughout the admission of air, said valves and mechanism being arranged so that air from said air pump is being admitted to one end or the other of said cylinder at all times.

13. In a double acting internal combustion engine, a firing cylinder, a piston therein, an air pump connected to said cylinder on each side of said piston, valves controlling the admission of pumped air to said cylinder, and mechanism operating said valves to admit air from said pump to said cylinder on one side or the other of said piston at all times.

14. In an engine, a firing cylinder with walls at both ends, a piston between said walls, a piston rod extending through suitable stuffing boxes in said walls, and valve gear mechanism and ignition means operating on both sides of said piston in timed relation to successively admit fuel, compress the same, explode the same, exhaust the same, admit air, and exhaust air.

15. An engine as specified in claim 14 which also includes means in addition to said piston for forcing air through the cylinder during the air admission cycle.

16. In a six cycle engine, three firing cylinders, individual pistons therefor, a common piston rod for said pistons, an air pump, two fuel inlet valves in each cylinder located on opposite sides of said piston, two compressed air valves in each cylinder located on opposite sides of said piston, two exhaust valves in each cylinder located on opposite sides of said piston, two firing elements in each piston located on opposite sides of said piston, and timing mechanism providing a cycle of fuel inlet, compression, firing, exhaust, air inlet, and air exhaust strokes in each end of each cylinder, said mechanism providing a power stroke on one side of one piston during each cycle.

17. An engine as specified in claim 14 which also includes means in addition to said piston for exhausting fuel, admitting air, and exhausting air, during respective cycles.

18. An engine as specified in claim 14 which includes, in addition to said piston, a pump for supplying air to the cylinder and a pump for exhausting fluids from the cylinder.

19. An engine as specified in claim 14 which also includes, in addition to said piston, an air compressor for supplying air to the cylinder and an exhaust pump for exhausting exploded fuel gas and air from the cylinder during respective cycles.

In testimony whereof I hereunto affix my signature this 5th day of August, 1929.

ROBERT E. KRUG.